Patented Mar. 3, 1931

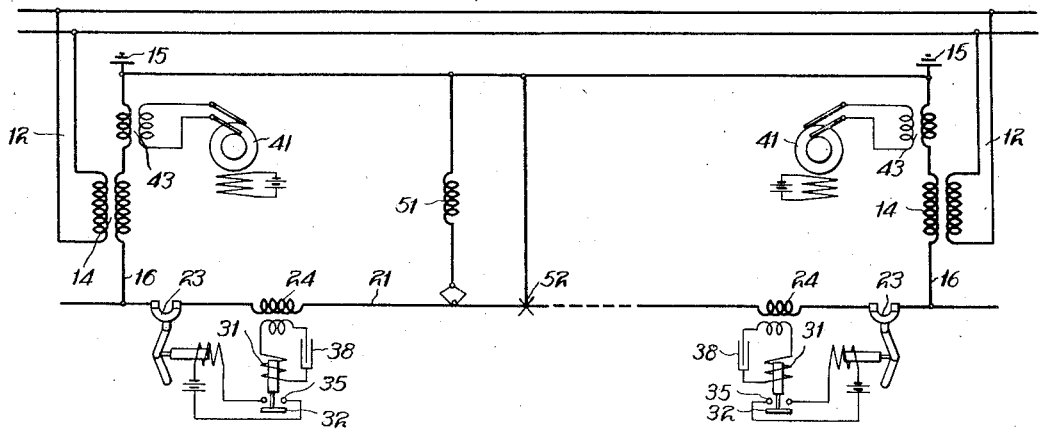

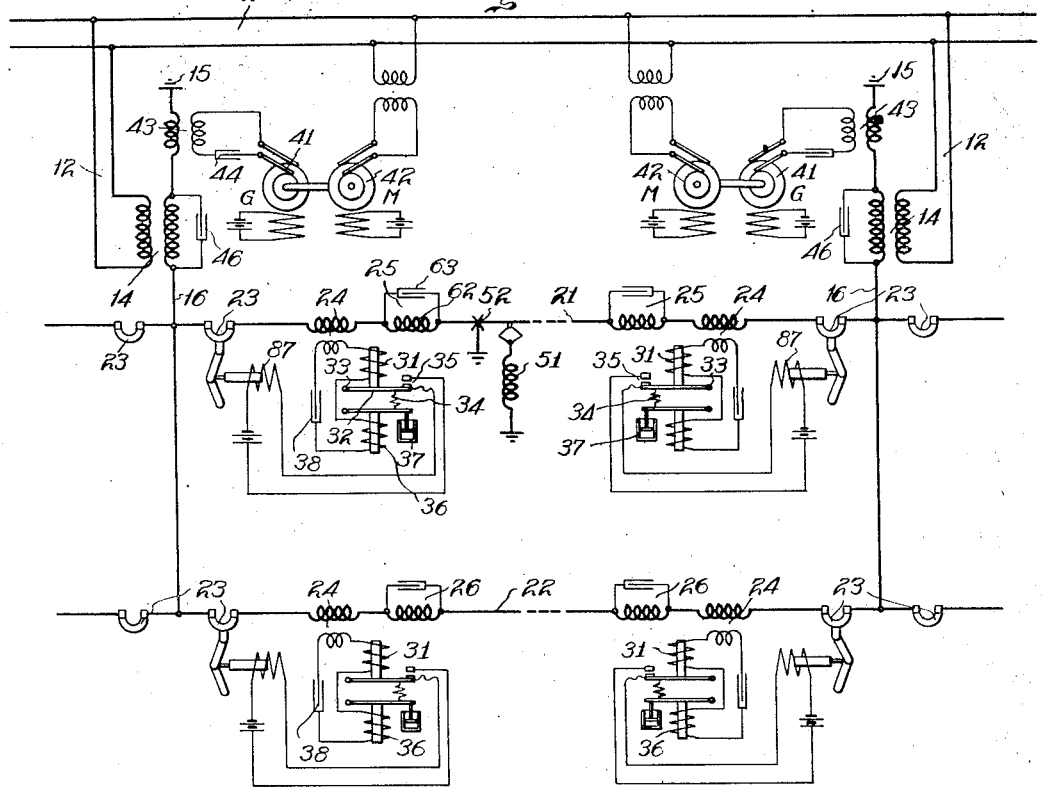

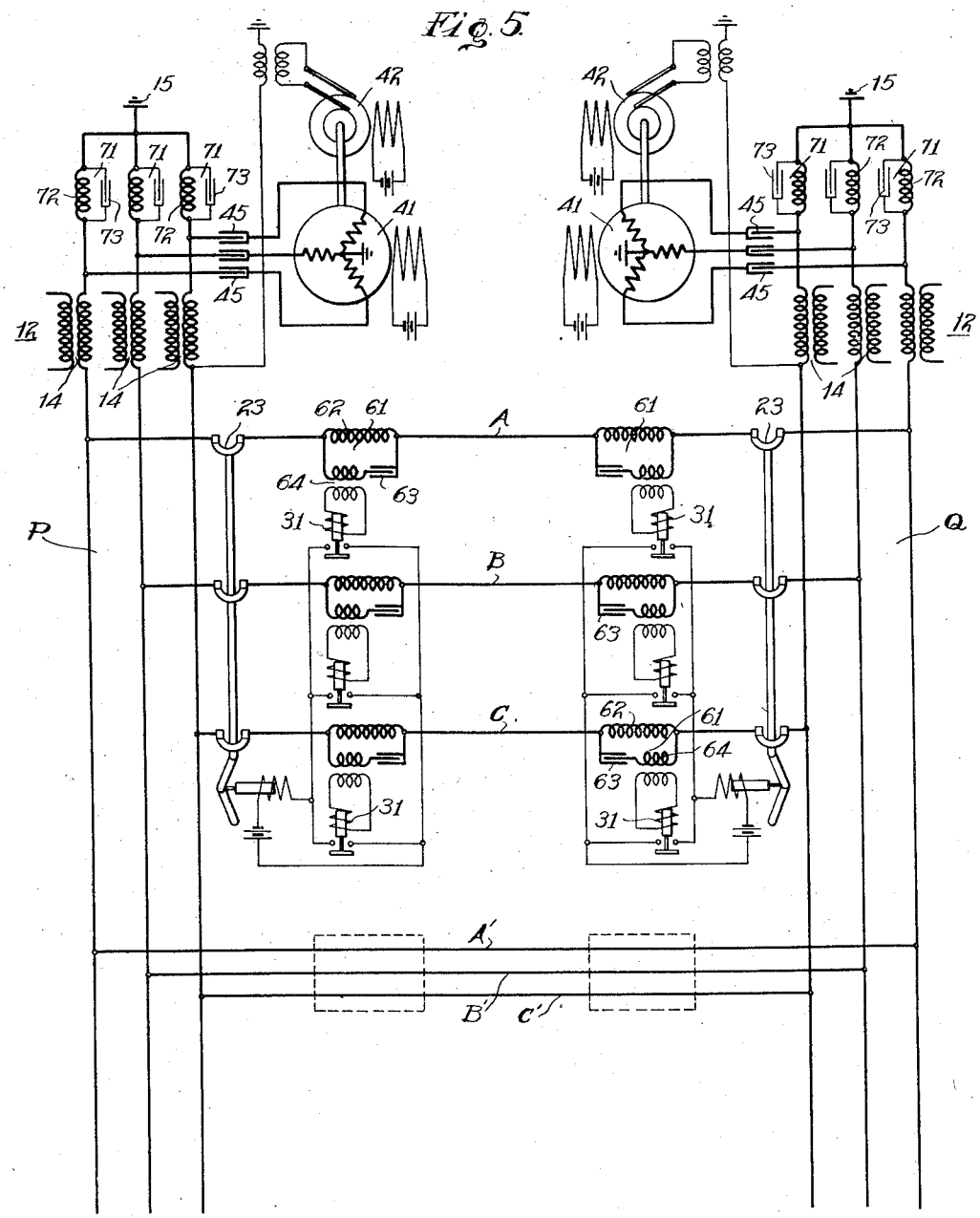

1,794,970

UNITED STATES PATENT OFFICE

LEON R. LUDWIG, OF WILKINSBURG, PENNSYLVANIA, ASSIGNOR TO WESTINGHOUSE ELECTRIC & MANUFACTURING COMPANY, A CORPORATION OF PENNSYLVANIA

HIGH-FREQUENCY CIRCUIT-BREAKER CONTROL

Application filed October 20, 1927. Serial No. 227,462.

This invention relates to systems for controlling circuit breakers and for protecting power systems against fault conditions and particularly to such systems as utilize superposed control currents of a frequency different from that of the main source of power.

The principal objects of this invention are as follows:

1. To provide a means and a method of measuring line-circuit impedance to currents of an auxiliary-source frequency or periodicity, the circuit being closed by a connection between the line and its return path.

2. To obtain selectivity between parallel-connected lines or conductors by distribution of the auxiliary currents between the good and the faulty conductors by means of impedance devices connected in the conductors, arranged to provide high-impedance paths for auxiliary currents in the non-faulty conductors.

3. To provide a protective system, the selectivity of which is dependent upon the network impedance to a superposed current.

4. To provide a protective system having a relatively high speed of operation in isolating a fault condition.

5. To provide a protective system capable of effective use with high-speed circuit breakers.

6. To provide a circuit-breaker-control system which shall give simultaneous operation of circuit breakers at both ends of a faulty conductor or line.

7. To provide a circuit-breaker-control system having selectivity of such high degree that a faulty line or conductor only may be isolated, without disturbing parallel lines or other lines on which there is no fault.

8. To provide a protective system which shall distinguish between a fault current and a load current, particularly in cases where the load current may be of greater value than the fault current.

9. To provide a system for differentiating from all transients which may give false operation.

10. To provide a circuit-breaker-control system for a power system that shall be dependent upon the measurement of the impedance to a control current of special frequency superposed upon the system between a number of different points.

11. To provide a high frequency-circuit-breaker-control system which shall avoid the utilization of expensive tuned high-impedance devices on parallel conductors.

12. To provide a protective system for utilization with a high-voltage power system, the protective system being so arranged as to avoid the necessity of insulating a large part of it for the high voltage.

13. To provide a circuit-breaker-control system which shall have a minimum number of sources of auxiliary control current and which shall avoid the use of an auxiliary supply system for each individual line or conductor.

14. To provide a protective system having little sensitivity to variations in frequency of the superposed control currents.

15. To provide a circuit-breaker-control system for a power system controlled by currents superposed upon the power system, as a whole, rather than upon individual conductors of the power system.

16. To provide a circuit-breaker-control system for a power system that shall be dependent upon the measurement of the impedance to a control current of special frequency superposed upon the system between a number of different points in the system, the system being so arranged that the impedance, as measured between any two points at which circuit breaker action is desired, is less than between any other points.

17. To provide a circuit-breaker-control system that shall be arranged for automatic reclosing of circuit breakers.

The general principle utilized in this system for controlling circuit breakers and protecting a power system against fault conditions is to supply, to the entire network, a superposed current of a special frequency which shall be different from that of the main source of power and to utilize this current for the purpose of measuring the impedance between a plurality of different points within the power system network arranged so that the impedance to the superposed currents, as measured between any two points in which relay action is desired, is less than that between any other points. A relay actuated because of the difference in such impedances and, consequently, because of the difference in the distribution of currents is utilized to control the connections to the power system by means of circuit interrupters.

On railway or polyphase power systems having a number of parallel lines, there are unique possibilities in superposing on the lines a current of a frequency of the magnitude of 500 cycles or higher which may be utilized to gain selective protection under all fault conditions. The principle involved is the measurement of the impedance of the power system with high-frequency current and high-frequency relays so placed that, under abnormal conditions, the impedance of a faulty line, as measured by the relay apparatus protecting that line, is sufficiently low to cause circuit-breaker operation.

This protective system may be applied to any power system whatever, whether alternating-current, single-phase or polyphase, grounded or ungrounded, or direct current, provided only that the system shall have a superposed current of a special frequency for the purpose of measuring the impedance of the power-system network, as a whole. In this particular instance, however, it is described with reference to a single-phase power system and is illustrated in several of its forms.

My system is differentiated from some systems heretofore used by employing a superposed special control current in several paths, the principal difference being that the superposed currents in this system are applied to the entire network, as a whole, in contradistinction to applying them to individual conductors only and isolating them therein, as is described in copending applications, Brown, Serial No. 20,310, filed Apr. 2, 1925; Hinton, Ser. No. 74,216, filed Dec. 8, 1925; Peters, Serial No. 220,554, filed Sept. 19, 1927; and Peters, Serial No. 221,605, filed Sept. 23, 1927, all assigned to the Westinghouse Electric & Manufacturing Company.

Figure 1 is a diagram illustrating the fundamental principle of this protective system which is controlled according to line impedances, as measured by a superposed special frequency current.

Fig. 2 is a diagram representing the preferred form of the invention applied to a single-phase railway power system having parallel contact lines or conductors.

Fig. 3 is a diagram representing another system for applying the superposed special control currents to a power network and also another system for supplying the control current from each line to the relay.

Fig. 4 is a diagram representing still another method of supplying the auxiliary currents to the main-source feed-in circuit.

Fig. 5 is a diagram representing the invention as applied to a three-phase power system.

In Fig. 1, the principle of one of the features of this invention is illustrated. This feature is concerned with the method of feeding in the superposed control currents of special frequency and the paths of flow of such control currents when a fault condition or other change in circuit impedance occurs.

The system includes a transmission line 11 for energizing the circuits 12, which may be located at different substations of a power system, and for energizing the power transformers 14 located at the same stations. The transformers or power sources 14 supply energy at 25 cycles, for example, through feed conductors 16 to a line or conductor 21 to be protected, the return path for which may be ground returns 15 which are shown connected together in order to illustrate the principle of operation of a part of this invention.

Isolating devices 23 are provided which, when operated, are adapted to control the connections of the line 21. For the control of the isolating devices or circuit-interrupters 23, there is provided relay apparatus including the relays 31, condensers 38 and current transformers 24, the complete functions of which will be described later. For furnishing the control currents of special frequency, there are provided synchronized auxiliary sources 41 of constant-voltage energy which are connected to the feed conductors 16 by means of the transformers 43.

It should be observed that the special-frequency currents from the sources 41 are superposed at the low-voltage or ground side of the power system directly upon the feeder conductors 16 and that they are not isolated to the individual conductors 21 to be protected, as in systems heretofore used. Stated differently, the special-frequency currents are superposed on the power network and are not isolated to the individual conductors thereof by blocking devices in the conductors to be protected. The devices 61, to be described in connection with Fig. 2, are not blocking devices but are devices of lesser impedance for distributing the special-frequency currents between parallel conductors when such parallel conductors 21, 22 are used, as is shown in Fig. 2.

The purpose of Fig. 1 then, is to illustrate the principle of this invention in which the special-frequency currents are superposed on the network at the low-voltage side thereof. By this invention, therefore, the cost of insulating the auxiliary apparatus 41, 43 may be substantially reduced.

The principle of operation is the automatic measurement of the impedance of the power system with the superposed currents generated by the auxiliary sources 41 and with relay apparatus 31, 38 responsive to the magnitude of such special-frequency currents, the relay apparatus being so placed that, under abnormal conditions, the impedance of a faulty line as measured by the relay apparatus protecting that line only is sufficiently low to cause circuit-breaker operation.

When a fault 52 occurs on the conductor 21 to be protected, and its return path 15, such fault 52 closes the circuits connected to both the sources 41 and the auxiliary currents in such circuits traverse the current transformers 24. The magnitude of such special-frequency auxiliary currents will depend on the impedances of the respective circuits which, in the case of a substantially non-inductive short-circuit connection 52, will be relatively small. The special-frequency currents resulting will, therefore, be of values relatively large as compared to those of the normal condition when the auxiliary currents flowing may be approximately zero.

The auxiliary currents traversing the current transformers 24 are utilized to energize the relay apparatus 31 which responds to a predetermined value of such auxiliary currents and thus isolates the line 21 upon the occurrence of a fault 52 thereon. The relay apparatus 31, therefore, measures the impedance of the power network with special frequency currents. If such impedance is small, as when a non-inductive fault 52 occurs, the relay apparatus associated therewith will operate to isolate only that portion of the power network responsible for such low impedance.

The same principle applies when a load such as the locomotive 51 is connected to the line 21, but the effect is different because the load 51 offers a relatively large impedance to the passage of the high-frequency auxiliary currents by reason of the relatively large inductance associated with such load apparatus 51. Only relatively small values of auxiliary currents, therefore, will traverse the relay apparatus 31. These currents are insufficient to cause operation of the relay apparatus 31 and, consequently, the position of the interrupters 23 remains undisturbed. In other words, the relay apparatus 31 is adjusted to be effectively responsible only to the relatively higher values of auxiliary currents caused by a fault such as 52.

The relay apparatus 31 is not affected by the main source currents. The condensers 38 are provided to prevent such main source currents from influencing the relay apparatus 31 by obstructing such currents of main-source frequency from the circuits of the relay apparatus.

The functions of the various elements entering into this invention will be described in more detail in the following figures. Fig. 1 has been employed merely to illustrate the principle of measuring the network impedance by the use of high-frequency current applied to the low-voltage side of such network.

In Fig. 2 is represented a section of a single-phase railway power system, which furnishes power from the bus bars or high-voltage line 11 at 25 cycles to the step-down stations 12, located at the ends of the section. Energy from the main source of power 11 is supplied through transformers 14 at the ends of the section in the feed-in circuits 16 to the ends of the conductors or contact lines 21 and 22, which are connected in parallel-circuit relation. The usual circuit interrupters 23 are provided near the ends of the contact lines 21 and 22 and are similarly located in adjacent or other sections of the power network. The usual actuating means for the circuit interrupters are supplied.

An auxiliary source of constant-voltage power of a special control frequency 41 is provided in each substation. In the particular instance, the auxiliary current of 500 cycles is furnished by a generator driven by a synchronous motor 42 energized from the main source of power at 25 cycles. The source of 500-cycle current 41, however, may be driven by means other than the synchronous motor 42, as by a direct-current motor or other type of motor or prime mover having similar characteristics. When the synchronous motor 42 is employed, its source of power is, preferably, the 25-cycle current, stepped down, in voltage, from that of the contact lines 21 or 22 or from that of the main power bus bars 11. One auxiliary source 41 per station is sufficient. The two 500-cycle generators 41 at the two ends of the contact lines 21 and 22 operate continuously in phase opposition or synchronism. One terminal of the auxiliary source 41 is connected to the return path which, in this particular case, is a ground return, and the other terminal is connected, through a condenser 45, to the feed-in conductor 16 on the ground or low-voltage side of the power transformer 14. It is obvious, therefore, that, with this particular modification of the invention, it is not necessary to insulate the auxiliary sources against the high-voltage of the contact lines 21 and 22.

The condenser 45, inserted in the lead from the 500-cycle generator 41, is for the purpose of "tuning out" the leakage reactance of the transformer 14. By "tuning out" leakage reactance is meant selecting a condenser of such a capacity that its reactance will equal that of the transformer. The 500 cycle current may then enter the main conductors without opposition.

The principal advantages of the condenser 45 are two-fold: first, in case the transformer 14 is designed to have a high impedance, such impedance need not interfere with the flow of 500-cycle current to the contact lines through the transformer 14; and, second, the condenser 45, in series-circuit relation with the transformer 14, forms, when tuned, a series-resonant circuit at 500-cycles which will act as a filter for the wave form of the high-frequency generator 41. It is highly desirable that the 500-cycle wave form be sinusoidal in order that the best results may be obtained from the devices 61, 71 in this system which have to be tuned to that frequency.

Installed on the ground side of the transformer 14, between the transformer 14 and the ground 15, is a tuned impedance or blocking device 71 of relatively high impedance, about 500 ohms, to the passage of the 500-cycle auxiliary current. The purpose of this tuned impedance or blocking device is to prevent the 500-cycle current introduced into the network from the auxiliary source 41 from flowing to ground 15, and to direct it rather toward the transformer 14, in case a circuit is closed between any of the contact lines 21 and 22 and ground; that is to say, it is desired that the 500-cycle current shall flow through the conductors or contact lines and return to ground through the tap load or the equipment, such as 51, or through a possible short-circuit connection, such as 52, rather than through the blocking shunt 71. This blocking device 71 will freely pass the 25-cycle load current which will travel almost entirely in the reactor 72. The impedance shunt 71 must be resonant at 500-cycles, that is, the condenser reactance 73 must equal that of the reactor 72 at the superposed frequency, and adjustments must accordingly be made. In addition to its function of obstructing the passage of 500-cycle current and also of passing freely the 25-cycle current, it has a certain advantage in addition that it will limit somewhat the flow of 25-cycle current in case of a short-circuit, as at 52, for example, on line 21.

Near each end of each contact line to be protected 21 and 22 is installed a tuned impedance device 61 which comprises a reactor 62 and condenser 63 connected in parallel-circuit relation and tuned to the auxiliary frequency of 500 cycles. The device is of relatively low impedance (about 30 to 40 ohms at 500 cycles) which may be obtained by a very small reactor or condenser at a considerable saving in cost over the impedance devices or blocking shunts of relatively high value of impedance heretofore used. The magnitude of its impedance at 500 cycles is approximately that of its associated contact line 21 at 500 cycles, but its impedance to 25-cycle load current is very low. When properly tuned to the frequency of the auxiliary source, it is an inexpensive means of obtaining an impedance to 500 cycles of sufficient value to perform the function for distributing 500-cycle currents between the parallel conductors 21 and 22 in order to obtain selectivity of circuit-breaker action, as between the good and the faulty parallel conductors. The device 61 may be installed as shown, or next to the bus bars.

A current transformer 64 is placed in series with the condenser 63 and is used as a means of supplying 500-cycle current for the operation of the circuit-breaker-tripping relay 31. The 500-cycle current, in this transformer 64 and likewise, in the condenser 63, is exactly proportional to any 500-cycle current that may be flowing in the contact line 21. Only a very small percentage, or a negligible percentage of 25-cycle current will flow through the current transformer 64 because of the high impedance of the condenser 63 to 25 cycles. Therefore, practically only 500-cycle current can flow in the operating coil 31 of the circuit-breaker-actuating relay.

Connected across the terminals of the circuit interrupter 23, is a condenser 81 which is designed to readily pass currents of 500 cycles from the auxiliary-source 41 and to obstruct currents of 25 cycles. The purpose of the condenser 81 is to provide means for supplying 500-cycle current to the relay in case such current has been cut off by the opening of the circuit-breaker contacts 23 and it is desired to provide for automatically closing the circuit breakers.

In other words, when the circuit interrupters 23 are in open position, the 500 cycles current from the auxiliary sources 41 would have in the absence of the condensers 81 no access to the circuit-interrupter-actuating relays 31. The condensers 81 are provided, therefore, to supply such 500 cycles current to the relays 31, in case it is desired to obtain automatic reclosing of the circuit interrupters 23, as, for example, after a fault condition has been removed, it may be desirable to automatically reclose the circuit interrupters 23 immediately. To do this, a reclosing coil 86 may be associated with the circuit interrupters 23, as is illustrated in Fig. 2. Herein, the non-faulty position of the operating relay 31 is utilized to close contacts 85 and actuate the reclosing coil 86, while the faulty position of relay movable member 32 is utilized to close contacts 35 and to actuate a trip coil 87. I have illustrated the closing and trip-coil circuits in a simple manner to indicate the operations to be performed.

Under normal conditions of operation, the circuit interrupters 23 are closed, and power is fed to all the contact lines, such at 21 and 22, at 25 cycles from the main sources of power 14. Such load-frequency currents readily pass through the blocking device 71 to ground 15 and through the tuned impedance devices 61 to supply energy to load equipment, such as 51, connected to the contact line and to its return path.

Likewise, under normal conditions, generators 41, at different stations, are running in phase synchronism and no appreciable 500-cycle auxiliary current is flowing in the power system.

If a short-circuit occurs, as at 52, on contact line 21, a closed circuit is established to the passage of 500-cycle current from both generators 41 at the ends of the line. The path of such current is through the condenser 45, the transformer 14, the feed-in line 16, the circuit interrupter 23, the impedance device 61, the short-circuit 52 and back through the ground return to the other terminal of the generator 41. The value of 500-cycle current flowing, under such conditions, will be dependent upon the impedance of the auxiliary circuit paths just traced. A portion of such 500-cycle current will be transmitted through the transformer 64, to the operating coils 31 of the relays and will serve to actuate circuit interrupters 23 and interrupt the line, simultaneously, at both ends of the contact line 21. This system will, therefore, give simultaneous operation to isolate both ends of a faulty line and thus provide for a minimum amount of interference in neighboring communication signalling and safety circuits.

When such a short-circuit as 52 occurs on the contact line 21, a certain amount of current will flow to the fault from the main source of power at each end of the line through the parallel, non-faulty contact line 22, in a direction dependent upon the location of the fault in contact line 21. Such current at 500 cycles, however, in the parallel non-faulty contact line 22 will be relatively small in value, as compared with that in the faulty contact line 21, because of the relatively high impedance imposed by the tuned impedance devices 61 located in the contact lines 22; that is to say, the 500-cycle current, to reach the fault 52, through the contact line 22, must pass through three different units of tuned impedance devices 61, whereas, such current need pass through only one impedance device to reach the fault directly through line 21. Therefore, the relay current in the relays associated with the faulty contact line will be greater than the 500-cycle currents flowing in any other lines and this difference or variation in distribution of currents between the good and the faulty conductors is utilized to operate circuit interrupters in the faulty line 21 only. This system is, therefore, selective to a very high degree for faults occurring in parallel contact lines.

The load equipment 51 placed upon the contact line 21 provides a closed path also for the passage of the 500-cycle current and, accordingly, some current will flow through the operating relay coils 31. However, because of the high impedance of such load connections to 500 cycles, this current will usually not be enough to cause the relays to trip. Relay settings depending upon this differentiation between the load current and the short-circuit current become ineffective, however, when three or more locomotives are placed on the contact line 21, because, as more locomotives come into the section, their impedances being in parallel, the impedance of the auxiliary circuit is thereby reduced, increasing the flow of auxiliary current. To give this system a greater differentiation between the fault currents and load currents, a relay may be used to pre-set relay 31, in accordance with load conditions or circuit conditions, or both, combined as described in copending Ludwig application Serial No. 238,861, filed Dec. 9, 1927.

One variation of such a pre-setting relay is illustrated by device 36 of Fig. 3, which is utilized to pre-set the operating relay 31.

The operating relay comprises the operating coil 31 responsive to 500 cycle currents only for controlling the movable member 32 pivoted at 33 which, when actuated, closes the contacts 35 and, in turn, energizes the trip coil 87 of the circuit interrupter 23 and thus disconnects the line 21 from the main source of power 14. Associated with the operating element 31, is a pre-setting or adjusting or regulating element 36 which is utilized to pre-set the operating element 31—32 by tightening a spring 34, with a time delay means 37. The presetting element will, therefore, automatically adjust the operating relay in accordance with load conditions, and provide a means for greater differentiation between load conditions and fault conditions. This pre-setting relay is described in detail in my copending application herein referred to.

Likewise, other refinements may be employed to compensate for out-of-phase currents between the generators 41, all of which have been described in the applications hereinbefore referred to.

From the foregoing description, it is evident that this system operates to isolate a faulty condition only that it is dependent upon the power system net-work impedance to the superposed auxiliary current, and that the relays actuating the circuit interrupters are responsive to such differences in line impedances.

In Fig. 3 is illustrated another means of supplying auxiliary currents to the power system, as well as another means of transmitting the auxiliary current from the conductors or the contact lines 21 and 22 to the operating relays 31.

In this modification, the 500-cycle auxiliary current from source 41 is supplied, through a transformer 43, to the contact lines as before, through the feed-in conductor 16. The transformer 43 is connected, in the ground lead 15, to the main transformer 14 and, consequently, need not be insulated to the high line voltages. It must be so designed that it will not saturate with 25-cycle current but that it will serve to introduce the 500-cycle current from auxiliary source 41 into the power system network. For that reason, it should preferably be constructed with an air gap in the core. The condenser 44 may be used for the purpose of preventing 25-cycle current from flowing into the 500-cycle generator 41, which would tend to cause the generator to operate as a 25-cycle motor and destroy, to some degree, the operation of the system. The condenser 44 should be tuned to the reactance of the transformer 43 for the purpose of filtering the wave form of the generator 41, for the reasons described hereinbefore.

Although it is not essential, the condenser 46, connected across the terminals of the transformer 14, may be employed to advantage in case the reactance of the main transformer 14 is of high value. In such case, the condenser 46 serves as a low-impedance by-pass for the passage of the 500-cycle current in order not to hinder its flow. The method of introducing current from the 500-cycle source 41, as described and illustrated in Fig. 2, is preferred because of the large size of the transformer 43 that would be required in the system illustrated in Fig. 3.

Now, as to the means and method of supplying the relays with 500-cycle current from the contact lines, the tuned impedance device 25 is used for the same purposes as were considered in describing Fig. 2 with reference to device 61, except that device 25 does not contain the current transformer described in that figure. Consequently, the device 25 serves only as a means for distributing auxiliary-source currents between the good and the faulty parallel conductors 21 and 22. In this arrangement, as shown in Fig. 3, transformer 24 is utilized to supply the auxiliary currents to the circuit-interrupter actuating-relay 31. A condenser 38 must be used to prevent the 25-cycle current from entering the relay coil 31 and causing false operation of the circuit interrupters 23. The preferred arrangement, however, for supplying these currents to the relays is illustrated in Fig. 2; that is to say, to place the current-transformer 64 in series with the condenser 63 of the tuned impedance device 61, rather than to place it in the contact line, as illustrated by device 24 in Fig. 3, since the current transformer 24 placed in the contact line must necessarily be relatively large, as compared with that placed in the tuned impedance device 61.

In Fig. 3 is illustrated the pre-setting relay 36 heretofore referred to and particularly described in my copending application Serial No. 238,861, filed Dec. 9, 1927.

In Fig. 4, another method of supplying the 500-cycle auxiliary current to the power system is illustrated. This method is similar to that illustrated in Fig. 2, except that the 500-cycle current does not have to pass through the main transformer 14 and, in case the reactance of this transformer 14 happens to be of high value, the method of Fig. 4 shown here may prove more advantageous. This is particularly true if the transformer source 14 consists of a bank of several transformers and if units of such transformers are added or subtracted from the line, with the constant necessity of so adjusting the condenser 45 illustrated in Fig. 2 as to form the series resonant circuit, which is desirable. In other words, since the condenser 45 may be tuned to but one combination of this transformer bank at a time, the method of Fig. 4 may be advantageous, where the transformer bank is subject to change or modification.

In Fig. 5 is illustrated the system as applied to a three-phase transmission line, as distinguished from a railway power network heretofore described. Parallel three-phase lines are shown designated by lines A, B, C and A', B', C' and the operation and means used to produce the operation are substantially identical with those heretofore described except that the auxiliary sources of power 41 may be three-phase 500-cycle generators having grounded neutrals.

The two parallel circuits extend between two stations P and Q, and upon the occurrence of a ground upon a conductor, the auxiliary currents traverse the resonant circuits and energize the associated tripping relay.

The resonant circuits in the feeder A', B', C' are represented by the rectangles and are the same as the circuits in the other feeder.

Mention has been made of the feature of automatic reclosing of the circuit-breakers 23. If the circuit breakers 23 in Fig. 2 are shunted with a condenser 81 which will pass the high-frequency current only with the circuit-breaker 23 open, the high-frequency current will retain the relays 31 in their operative position as long as the fault 52 remains on the line 21. When the fault 52 is removed, however, the relays 31 will return to normal and permit the breakers 23 to reclose. Such connection would be advantageous if the protected system is liable to faults of short duration.

The principal advantages of this system are:

1. It provides a means and method of simultaneous operation of circuit interrupters at both ends of a faulty line, with the consequent minimum interference with neighboring communication, safety and signal circuits.

2. It provides a high degree of selectivity between the good and the faulty parallel conductors such that only the faulty conductors are isolated and the good conductors in parallel or in adjacent or in other lines remain undisturbed.

3. It distinguishes between fault conditions and load conditions although the minimum short-circuit or fault current may be less than the maximum load current.

4. It provides a system of protection dependent upon circuit conditions, and, because it is applied to the entire network, as a whole, as distinguished from application to individual conductors of the system, it has much simplified apparatus.

5. Much of the apparatus in the systems heretofore used, which require insulation against high voltages, does not require such insulation in this system.

6. It is not as sensitive as systems heretofore used, to variations in frequency of the superimposed current.

Some of the principal distinguishing features of this invention are as follows:

There are no blocking devices in the parallel lines or conductors to be protected. The tuned impedance devices utilized in the conductors to be protected are non-blocking: they do not block or completely obstruct the passage of special-frequency currents, but on the contrary, allow such currents to pass with a certain measure of restriction. Their purpose is to pass an effective value of such currents only upon the occurrence of a fault associated therewith and to offer merely negligible impedance to the power currents. They accomplish this purpose by distributing the auxiliary currents between the parallel conductors in such manner that the maximum value of auxiliary current flows in a faulty parallel conductor.

The auxiliary currents are superposed on the power network by applying them directly to the feed conductors or to the extreme ends of the parallel conductors to be protected. The auxiliary currents are utilized to measure the network impedance as distinguished from that of the individual conductors alone and are not, therefore, isolated to the individual conductors.

Automatic reclosing features are provided for the interrupters.

The interrupter control means or relay apparatus is actually responsive to the magnitude of superposed currents or, stated differently, the special frequency auxiliary currents are not used merely for signalling purposes.

I claim as my invention:

1. In a circuit-interrupter-control system, the combination with a line or conductor, a return path therefor, a circuit interrupter therefor, actuating means for the circuit interrupter, a main source of power connected to the line and to the return path, and an auxiliary source of power of special control frequency different from the frequency of the main source, of means for applying auxiliary-source currents to the line through the main-source device and to the return path, means for applying auxiliary currents in the line to a relay circuit associated therewith, and for excluding main source currents from the relay circuit, and a relay responsive to auxiliary-source currents in the relay circuit for controlling the circuit interrupter.

2. In a circuit-breaker-control system, the combination with a line or conductor, a return path therefor, a circuit interrupter therefor, actuating means for the circuit interrupter, a main source of power connected through a feed-in circuit to the line and to the return path, and an auxiliary source of power of special control frequency different from that of the main source connected to said feed-in circuit, of means for applying the auxiliary-source currents in the line to a relay circuit associated therewith, and for excluding main-source currents from the relay circuit, and a relay responsive to auxiliary-source currents in the relay circuit for controlling the circuit interrupter.

3. The combination with a closed circuit including a feed-in conductor and another conductor to be protected, a main source of power connected therein, an auxiliary source of power of different frequency connected in the feed-in conductor, a circuit interrupter connected in the conductor to be protected, and actuating means for the circuit interrupter, of means responsive to the impedance of the closed circuit to currents of auxiliary-source frequency only for controlling the circuit interrupter.

4. The combination with a closed circuit including a feed conductor having a blocking device and a conductor to be protected, a main source of power connected therein, an auxiliary source of power of different frequency connected to the feed conductor, a circuit interrupter therein, and actuating means for the circuit interrupter, of means responsive to auxiliary currents determined by the closed-circuit impedance to currents of the auxiliary-source frequency for controlling the circuit interrupter.

5. The combination with a closed circuit comprising a main source of power, an auxiliary source of power of periodicity or frequency different from that of the main source and a circuit interrupter, all of the foregoing being connected in series-circuit relation, of means responsive to the currents in the closed circuit of the auxiliary frequency source for actuating the circuit interrupter when the impedance of the closed circuit to currents of auxiliary-source periodicity has a predetermined value.

6. In a circuit-interrupter-control system, the combination with a plurality of lines or conductors in parallel-circuit relation, a return path therefor, circuit interrupters therefor, actuating means for the circuit interrupters, a main source of power connected to the lines and to the return path, and an auxiliary source of power of special control frequency different from the frequency of the main source located near the ends of the parallel conductors, of means for applying the auxiliary-source currents to the ends of the parallel conductors and to the return path, means for applying auxiliary currents in each line to a relay circuit associated therewith near each end of each line, and for excluding main source currents from the relay circuit, means for distributing auxiliary currents between the faulty and non-faulty parallel conductors in accordance with impedance and relays responsive to the variation in magnitudes of the distributed auxiliary currents in the lines and associated relay circuits for controlling the circuit interrupters in the faulty line only.

7. In a circuit-breaker-control system, the combination with a plurality of conductors in parallel-circuit relation, circuit interrupters therefor, actuating means for the circuit interrupters, a main source of power applied to the conductors, an auxiliary source of power of special control frequency applied to the conductors, of impedance devices in each conductor for distributing the auxiliary currents between good and faulty parallel conductors, and a relay associated with each conductor responsive to the difference in magnitudes of the distributed auxiliary currents for actuating the circuit interrupters in the faulty conductors only.

8. The combination with a plurality of closed circuits formed by a plurality of conductors in parallel-circuit relation and connections from the ends thereof to points intermediate, a main source of power therein, auxiliary sources of power of periodicity different from that of the main source therein, each such auxiliary source being in synchronism or phase opposition and applied at each end of the parallel conductors, isolating devices for each conductor and actuating means for the isolating devices, of means for distributing auxiliary-source currents in the closed circuits between faulty and non-faulty parallel conductors, and means responsive to the impedance of the closed circuit to currents of auxiliary-source periodicity and to the difference in magnitudes of the distributed auxiliary currents between the parallel conductors for controlling the isolating devices simultaneously in the faulty parallel conductor only.

9. The combination for selectively controlling the connections of a plurality of parallel conductors to a main source of power including an auxiliary source of power of periodicity different from that of the main source applied to the conductors near each end, the auxiliary sources operating in synchronism or phase opposition, impedance devices in each conductor for distributing the auxiliary currents between good and faulty parallel conductors, and relays associated with each parallel conductor responsive to the variation in magnitudes of the distributed currents for controlling the connections between the main source and the faulty conductor only.

10. Means for controlling the connections of a parallel-connected conductor to a power system having a plurality of conductors, each equipped with circuit breakers near the ends thereof, including means for superposing upon the power system as a whole, special control currents of one definite frequency different from the frequency of the power system, and means responsive to the control current in the conductors for controlling the connection of the individual conductors to the power system, whereby any one of the conductors is disconnected when a fault occurs therein and is automatically reconnected when such fault disappears.

11. The combination for selectively controlling the connections of a power conductor to the rest of the system responsive to a fault condition but non-responsive to a load condition, including means for differentiating between the impedances of all circuits closed by a fault connection of relatively low impedance or by a load connection of relatively higher impedance, and independent sources of normally balanced auxiliary currents of a special frequency superposed at the extreme ends of the power line for automatically controlling said means.

12. A circuit-interrupter control system for an electric power system including auxiliary sources of normally balanced currents of a special frequency superposed at both ends of the feed circuits, on a plurality of conductor sections parallel-connected at their ends, tuned impedance devices inserted near the ends of each section for passing an effective special-frequency current through the associated section only upon the occurrence of a fault therein and for offering merely negligible resistance to the power currents, and means in each section responsive to the magnitude of auxiliary currents only when a fault occurs therein.

13. A circuit-interrupter control system for an electric power system including auxiliary sources of normally balanced currents of a special frequency superposed at both ends on the feed circuits on a plurality of conductor sections parallel-connected at their ends, tuned impedance devices inserted near the ends of each section for passing an effective special-frequency current through the associated section only upon the occurrence of a fault therein and for offering merely negligible resistance to the power currents, and means in each section responsive to the magnitude of auxiliary currents only when a fault occurs therein.

14. A protective system for a distribution circuit energized by power sources including normally balanced auxiliary sources of a single special-frequency current superposed at both ends on a plurality of conductors, parallel-connected at their ends, said auxiliary currents being introduced into the feed circuits common to the plurality of said parallel-connected conductors at the low-voltage or grounded side of said power sources, tuned impedance devices inserted near the ends of each section for passing an effective special-frequency current through the associated section only upon the occurrence of a fault therein and for offering merely negligible resistance to the power currents, and means in each section responsive to the magnitude of auxiliary currents only when a fault occurs therein.

15. A protective system according to claim 13, including a relay apparatus energized by the special-frequency current in an associated conductor only, and equipped with differential quick-acting and slow-acting elements, so disposed that said relay apparatus is subject to the influence of the difference between the special-frequency currents passing through the load or through a fault and is thereby stabilized and preset automatically.

16. A system according to claim 14, each conductor having circuit-interrupters at both ends controlled by relay apparatus, said relay apparatus being influenced by the magnitude of the special frequency currents traversing the associated tuned impedance devices.

17. The combination with a plurality of parallel-connected conductors connected together at both ends and connected to feed-in conductors at both ends, of auxiliary sources of normally balanced special-frequency currents, synchronized and superposed on the feed-in conductors at both ends, circuit-interrupters in each conductor for isolating said conductor, tuned impedance devices in each conductor for impeding but not for blocking the passage of special-frequency currents, and means responsive to the magnitude of the special-frequency currents in each conductor for controlling the associated interrupters.

18. The combination with a plurality of conductors connected together at both ends and energized by a main power source, of an auxiliary, constant-voltage source of special-frequency current associated with the feed-in wires to said parallel conductors, and means in each conductor tuned to the special frequency for impeding but not for blocking the passage of the special frequency currents and for passing freely the main source currents.

19. A selective protective system for a power network or system having a plurality of parallel lines, each including isolating devices, synchronized auxiliary sources of special-frequency currents adapted to be superposed on the power network, the magnitudes of said currents varying according to the impedance of the power network, and means including relay apparatus for controlling the isolating device so adapted that, under abnormal conditions, the impedance of a faulty parallel line is sufficiently low to cause operation only of the isolating devices associated therewith.

20. The method of selectively protecting a power network or system having a plurality of parallel lines which consists in measuring the impedance of the power network with special-frequency currents and controlling the faulty parallel line according to the parallel circuit of minimum impedance.

21. The method of obtaining selective protection for a plurality of conductors connected in parallel circuit relation which consists in distributing synchronized auxiliary currents of a special frequency between the parallel conductors in such proportions that the auxiliary currents of relatively large magnitude flow in the faulty conductor only and isolate the faulty conductor only.

In testimony whereof, I have hereunto subscribed my name this 6th day of October, 1927.

LEON R. LUDWIG.